United States Patent [19]

Ishiguro

[11] Patent Number: 5,255,044
[45] Date of Patent: Oct. 19, 1993

[54] AUTOMATIC EXPOSURE CONTROL APPARATUS WITH IMPROVED EXPOSURE VALUE CALCULATION FOR PHOTOGRAPHING A MOVING OBJECT

[75] Inventor: Yasuaki Ishiguro, Fujimi, Japan
[73] Assignee: Nikon Corporation, Tokyo, Japan
[21] Appl. No.: 965,521
[22] Filed: Oct. 23, 1992

Related U.S. Application Data

[63] Continuation of Ser. No. 709,289, Jun. 3, 1991, abandoned.

[30] Foreign Application Priority Data

Jun. 5, 1990 [JP] Japan ............................. 2-147957
Mar. 29, 1991 [JP] Japan ............................. 3-091738

[51] Int. Cl.$^5$ .......................... G03B 7/08; G03B 13/36
[52] U.S. Cl. ................................. 354/402; 354/430; 354/432
[58] Field of Search ..................... 354/429-434, 354/402, 403

[56] References Cited

U.S. PATENT DOCUMENTS

| | | | |
|---|---|---|---|
| 4,774,401 | 9/1988 | Yamada et al. | 354/432 |
| 4,831,403 | 5/1989 | Ishida et al. | 354/402 |
| 4,951,082 | 8/1990 | Takagi | 354/432 |
| 4,959,678 | 9/1990 | Nakagawa | 354/403 |
| 4,974,002 | 11/1990 | Ohnuki et al. | 354/402 X |
| 4,974,005 | 11/1990 | Izumi | 354/430 X |
| 4,977,423 | 12/1990 | Yamano et al. | 354/402 |
| 5,003,338 | 3/1991 | Takagi et al. | 354/402 |
| 5,005,039 | 4/1991 | Hamada et al. | 354/402 |
| 5,010,358 | 4/1991 | Miyamoto | 354/402 |

FOREIGN PATENT DOCUMENTS 63-148218 6/1988 Japan .
1-154133 6/1989 Japan .

Primary Examiner—W. B. Perkey
Attorney, Agent, or Firm—Shapiro and Shapiro

[57] ABSTRACT

An automatic exposure control apparatus calculates a predicted exposure value to be used at a time of exposure so as to account for predicted movement of an object between a time of photometering values corresponding to respective photometering areas may be weighted based, for example, on the detected movement speed of the object image plane of a phototaking optical system and on the distance to the object substantially at the time of photometering, and the predicted exposure value may then be calculated based on the photometering values as weighted. The weighting of the photometering values may be effected through selecting one of a plurality of possible photometering modes in which different photometering values are used for the exposure value calculation.

10 Claims, 12 Drawing Sheets

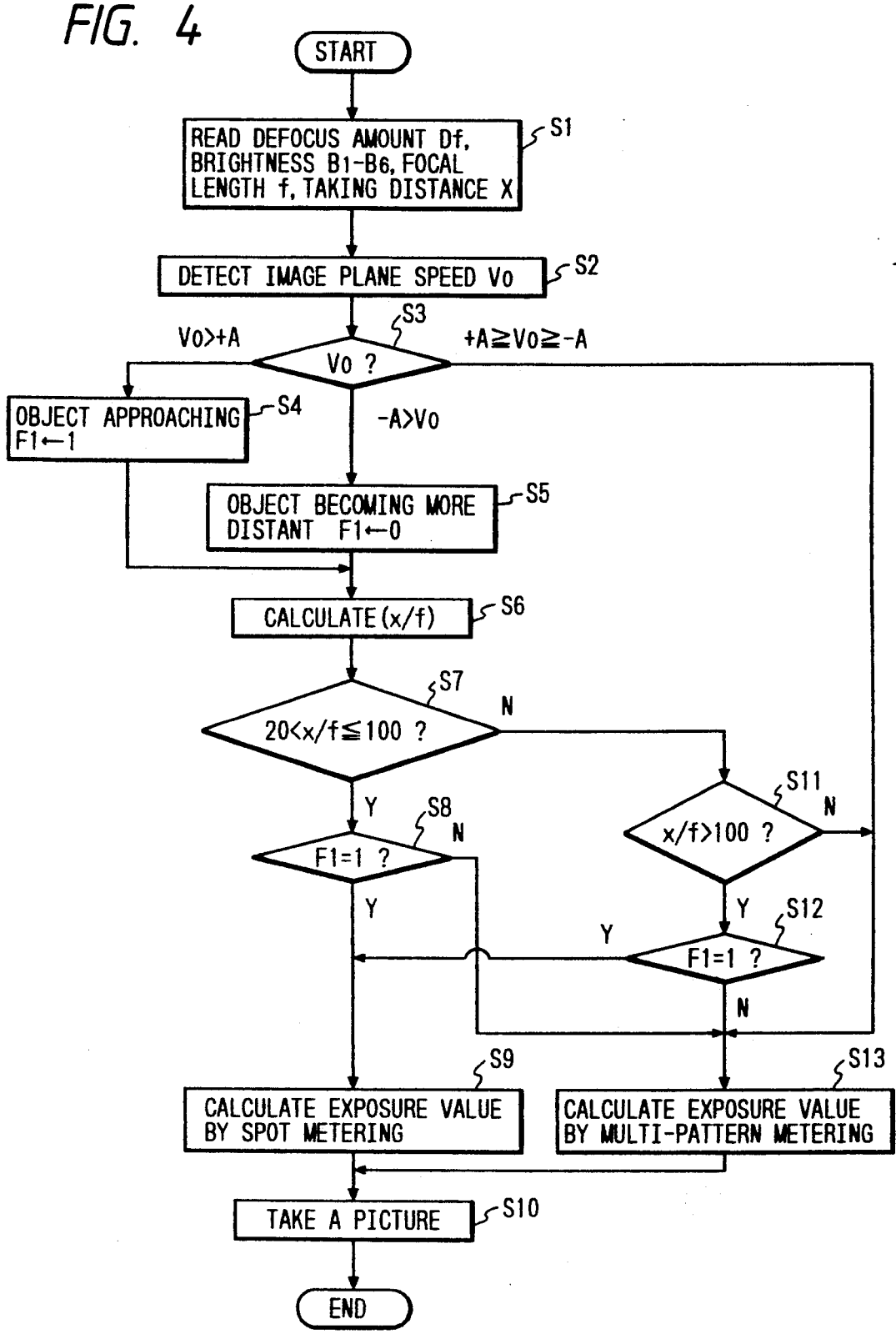

AUTOMATIC EXPOSURE CONTROL APPARATUS WITH IMPROVED EXPOSURE VALUE CALCULATION FOR PHOTOGRAPHING A MOVING OBJECT

This is a continuation of application Ser. No. 709,289 filed Jun. 3, 1991, now abandoned.

BACKGROUND OF THE INVENTION

1. Field of the Invention

The present invention relates to an automatic exposure control apparatus with improved exposure value calculation for a moving object. More particularly, the invention relates to an apparatus which calculates an exposure value so as to account for predicted movement of a moving object (and thus predicted change of size of the object within a phototaking image plane) between a time of photometering and a time of exposure, thereby to obtain an optimum exposure of the object.

2. Related Background Art

As a conventional automatic exposure control apparatus, there is known, for example, an apparatus which calculates an exposure value as described below.

As shown in FIG. 9, a field is divided into six areas P1 to P6. Photometering is performed for each area. Based on the values obtained by this photometering, exposure information used for an exposure value calculation is determined by the following equations $$SP = B6$$

$$CW = (B5 + B6)/2$$

$$BM = (B1 + B2 + B3 + B4 + B5)/5$$

$$BLM = (BM + Bmin)/2$$

$$BHM = (BM + Bmax)/2$$

where B1 to B6 are each a brightness; Bmin is a minimum brightness among brightnesses B1 to B6; Bmax is a maximum brightness; SP is exposure information determined by spot photometering only the central area P6; and CW, BM, BLM, and BHM are exposure information calculated by multi-pattern photometering using selected ones of the areas P1 to P6.

As to the multi-pattern photometering, CW is exposure information in which a weight is given to central areas P5 and P6 (hereinafter referred to as center-weighted photometering); BM is exposure information based on the average value of each of the areas P1 to P6; BLM is exposure information in which a weight is given to a low brightness; and BHM is exposure information in which a weight is given to a high brightness.

One of these kinds of exposure information is selected on the basis of the maximum brightness Bmax, and a brightness difference (Bmax − Bmin) between the maximum brightness Bmax and the minimum brightness Bmin. An exposure value is calculated on the basis of the selected exposure information. A shutter and a diaphragm are driven on the basis of this exposure value and a photograph is taken.

In addition, as disclosed in Japanese Patent Laid-Open No. 1-154133, a known apparatus determines an optimum exposure on the basis of information about a distance to an object obtained by a range finder and the brightness of each area obtained by the multi-pattern photometering described above, by taking into account, for example, the object distance and the brightness distribution condition of the field. For example, when there is a high brightness in P1 or P2 among the above-mentioned areas P1 to P6, this brightness is judged to be caused by the sun. Photometering outputs of P3 to P6 excluding the outputs of P1 and P2 are used to determine the exposure value. When areas P5 and P6, or area P6, are darker than the other areas, it is judged that a main object, e.g., a person, is against the light, and photometering outputs of the areas P5 and P6, or area P6, are used to determine the exposure value. Further, optimum exposure information is selected based on the distance to the object even if the brightness distribution of the field has the same pattern in the case where the main object is a person at a object distance of 3 m or a scene at an object distance ∞.

In a conventional automatic exposure control apparatus, a problem arises in that even if an exposure value is calculated on the basis of the optimum exposure information at a photometering time for a moving object, i.e., an object approaching or moving away from the camera, the exposure value is not an optimum value at the exposure time, because the size of the object within the phototaking image plane at the exposure time differs from that at a photometering time due to the time lag between the photometering time and the exposure time.

FIG. 10 shows how a phototaking lens is driven by means of an automatic focus control apparatus (hereinafter referred to as an AF apparatus) to follow an object moving closer to a camera. The image forming plane position where an image is formed by the phototaking optical system changes as indicated by the straight line X, and the phototaking lens position changes as indicated by the stepped line Y.

In FIG. 10, reference character Y1 denotes a time period in which range finding is performed by the focus detection optical system and a range finding element. During the same time period, photometering is performed by a light-receiving element. Reference character Y2 denotes a time period during which a defocus amount is calculated on the basis of the output from the range finding element; and reference character Y3 denotes a time period during which a phototaking lens is driven on the basis of the calculated defocus amount. The phototaking lens is driven by a drive amount D1 during this time period Y3 and reaches a position X1. However, at this time, the image plane position of the object has already moved to X2. Therefore, range finding is performed again during a time period Y4. In a time period Y5, the AF apparatus adds a drive amount D2' of which the object is predicted to move by the next range finding time period Y7 to a lens drive amount D2 proportional to the defocus amount obtained by the range finding performed again and drives the phototaking lens by the drive amount (D2 + D2') in the time period Y6. As a result, it is put in focus at X3 immediately before the next time period Y7. If the shutter release is operated in a period from Y1 to Y6, an exposure is performed after the phototaking lens is driven (Y6) and an in-focus photograph can be taken.

FIG. 6 is a view showing an object image, specifically, a person's image, within the phototaking image plane as the person moves closer to the camera in the manner shown in FIG. 10. The solid line in the figure indicates the person's image at X2 in FIG. 10. The person's image increases in size within the phototaking image plane with the passage of time and becomes the size shown by the dashed line at a focus position X3.

Suppose, for example, that photometering is performed during a period Y4 and an exposure value is calculated on the basis of the photometering value of each photometering area. At this time, the person's image does not occupy a large area within the phototaking image plane, as shown by the solid line of FIG. 6. Hence, multi-pattern photometering in which an exposure value is calculated on the basis of the average value of brightnesses of each area is performed. The actual exposure, however, is performed on the basis of this exposure value at the later in-focus time corresponding to the position X3; and, as described above, the size of the person's image within the phototaking image plane at the exposure time becomes the size indicated by the dashed line in FIG. 6. Therefore, center-weighted photometering (P5+P6) or spot photometering (P6) would be preferable to using the average value of brightnesses.

SUMMARY OF THE INVENTION

It is accordingly an object of the present invention to provide an automatic exposure control apparatus which is capable of calculating an optimum exposure value for a moving object at an exposure time.

Basically speaking, the foregoing object is achieved in accordance with the present invention by appropriately weighting one or more photometering values, corresponding to different areas of a phototaking image plane, so as to account for predicted movement of the object between the time of photometering and the time of exposure. A predicted exposure value is then calculated based on the weighted photometering values, and this value is used for taking the exposure. The weighting of the photometering values is preferably based on the movement speed of the object image plane of the phototaking optical system in response to movement of the object, and preferably also on a distance to the object (which is indicative of the area of the phototaking image plane occupied by the object image) substantially at the time of photometering. The weighting may be effected, for example, by adjusting at least one of the photometering values (such as by multiplying by a suitable coefficient) or by selecting among a plurality of photometering modes in which different photometering values are used for the exposure value calculation (e.g., spot metering versus multi-pattern metering).

According to one preferred form of the present invention, an automatic exposure control apparatus may comprise photometering means for photometering a plurality of areas within a phototaking image plane and outputting a plurality of photometering values each corresponding to a respective one of the areas; focus detecting means for calculating a defocus amount corresponding to a distance between an object image plane and a film plane of a phototaking optical system; image plane speed detection means for detecting, on the basis of current and past defocus amounts calculated by the focus detection means, movement speed of the object image plane of the phototaking optical system in response to movement of the object along an optical axis of the phototaking optical system; exposure value calculation means for calculating an exposure value on the basis of photometering values output from the photometering means; and photometering area weight setting means for setting a weight of one or more of the photometering values, based on a detection result of the image plane speed detection means, to cause the exposure value calculation means to calculate a predicted exposure value which is to be used at a time of exposure and which is different from an exposure value that would be calculated for the object as positioned at the time of photometering, so as to account for predicted movement of the object between the time of photometering and the time of exposure.

The foregoing apparatus preferably also includes object image area judging means for judging an area occupied by the object image within the phototaking image plane substantially at the time of photometering, with the weighting of the photometering values then being also depending on the judgement result.

According to another preferred form of the present invention, an automatic exposure control apparatus may comprise photometering mean for photometering a plurality of areas within a phototaking image plane and outputting a plurality of photometering values each corresponding to a respective one of the areas; photometering mode setting means for preliminarily setting a photometering mode for purposes of an exposure value calculation; focus detecting means for calculating a defocus amount corresponding to a distance between an object image plane and a film plane of a phototaking optical system; image plane speed detection means for detecting, on the basis of current and past defocus amounts calculated by the focus detecting means, movement speed of the object image plane of the phototaking optical system in response to movement of the object along an optical axis of the phototaking optical system; exposure value calculation means for calculating an exposure value on the basis of photometering values output from the photometering means; and photometering area weight setting means for setting a weight of one or more of the photometering values based on a detection result of the image plane speed detection means, regardless of the preliminarily set photometering mode, to cause the exposure value calculation means to calculate a predicted exposure value which is to be used at a time of exposure and which is different from an exposure value that would be calculated under the preliminarily set photometering mode for the object as positioned at the time of photometering, so as to account for predicted movement of the object between the time of photometering and the time of exposure.

The foregoing apparatus enables the preliminary setting of a photometering mode by the photographer, but allows a suitable weighting of the photometering values to be made automatically, regardless of the preliminarily set photometering mode, based on the detected object image plane moving speed. An object image area judging means, as discussed above, may also be included.

According to still another preferred form of the invention, an automatic exposure control apparatus may comprise photometering means for photometering a plurality of areas within a phototaking image plane and outputting a plurality of photometering values each corresponding to a respective one of the areas; focus detecting means for calculating a defocus amount corresponding to a distance between an object image plane and a film plane of a phototaking optical system; image plane speed detecting means for detecting, on the basis of defocus amounts calculated at different times by the focus detecting means, movement speed of the object image plane of the phototaking optical system in response to movement of the object along an optical axis of the phototaking optical system; exposure value calculation means for calculating an exposure value on the basis of photometering values output from the photometering means; and means for selecting one of a plurality of exposure value calculation photometering modes, based on a detection result of the image plane speed detecting means, to cause the exposure value calculation means to calculate a predicted exposure value which is to be used at a time of exposure and which is different from an exposure value that would be calculated for the object as positioned at the time of photometering, so as to account for predicted movement of the object between the time of photometering and the time of exposure.

The above and other objects, features and advantages of the present invention will be more fully appreciated from the following description of the preferred embodiments of the present invention, with reference to the accompanying drawings.

BRIEF DESCRIPTION OF THE DRAWINGS

FIG. 4 is a flowchart showing an exposure value calculation processing sequence;

DESCRIPTION OF THE PREFERRED EMBODIMENTS

First Embodiment

Figure 2:
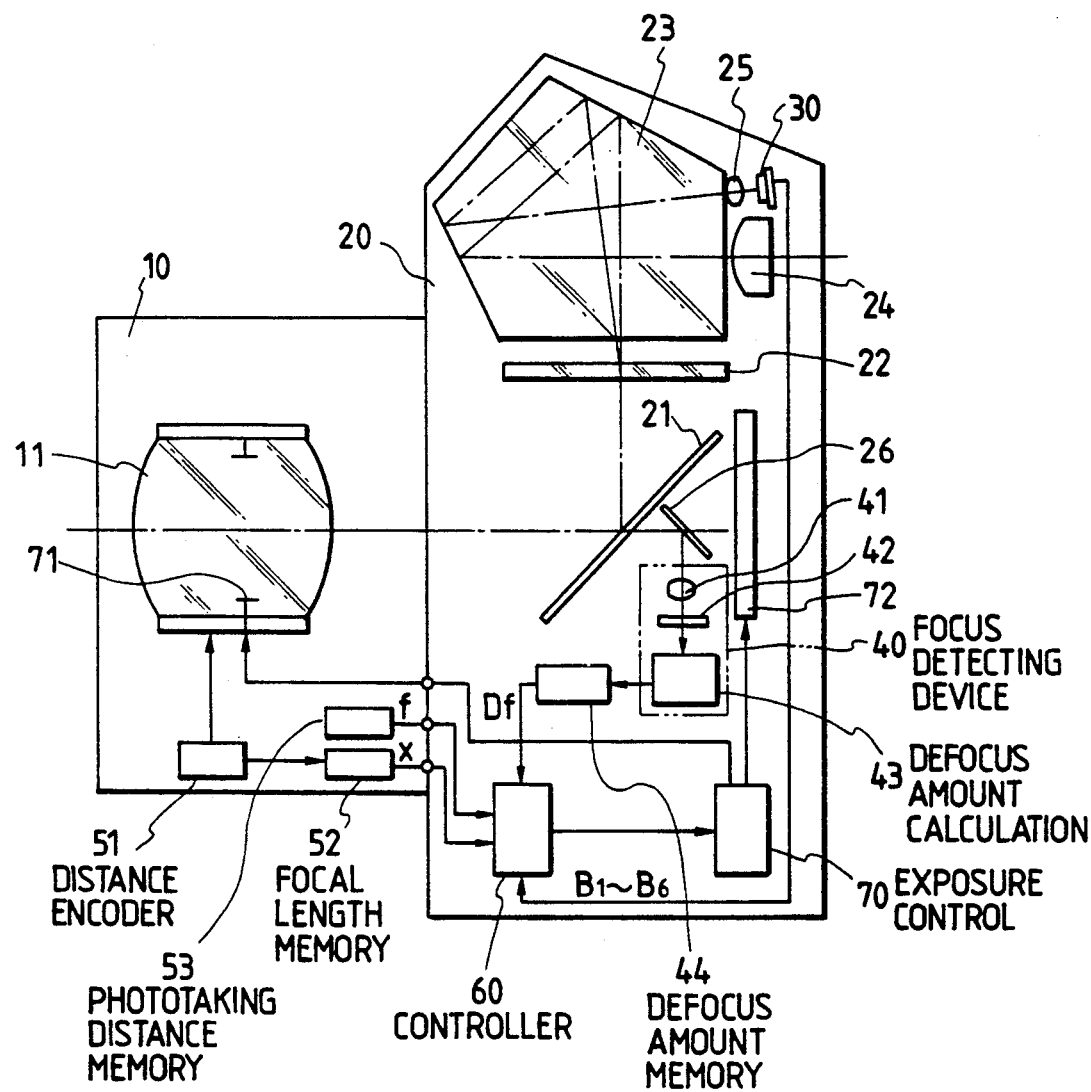
FIG. 2 is a diagrammatic view showing the construction of a camera equipped with an automatic exposure control apparatus of the invention.

FIG. 2 is a view showing the relevant construction of a camera equipped with an automatic exposure control apparatus according to the present invention. A light flux which passes through the lens group 11 of a camera lens body 10 is reflected by the main mirror 21 of a camera body 20 and diffused by a focus plane diffuser 22, following which it passes through a pentaprism 23. A part of the light flux is led to an eye piece 24 and the other parts pass through a condenser lens 25 and are led to a photometering unit 30.

Figure 3:
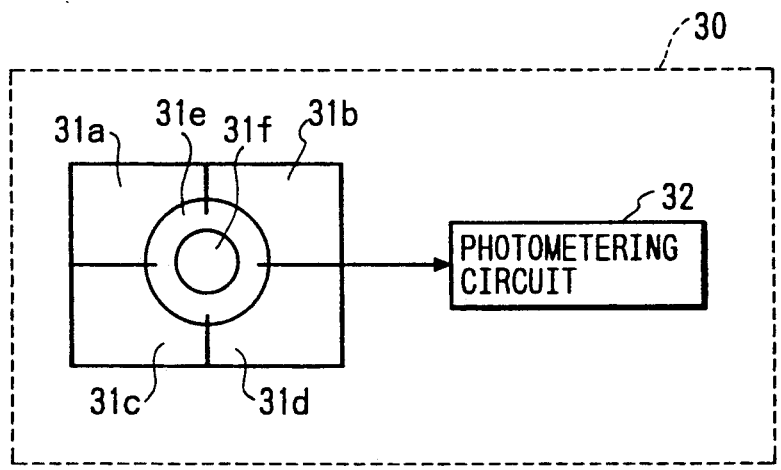
FIG. 3 is a diagram of a photometering unit.
Figure 9:
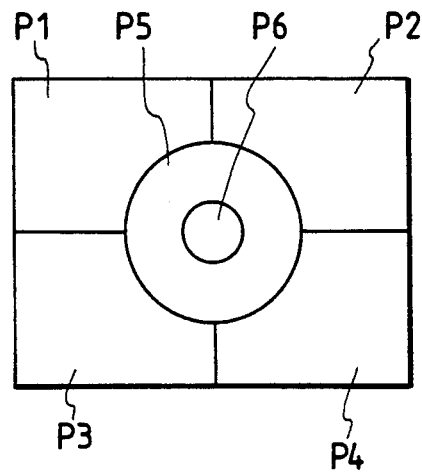
FIG. 9 is a view showing the areas of a photometering element.
Figure 10:
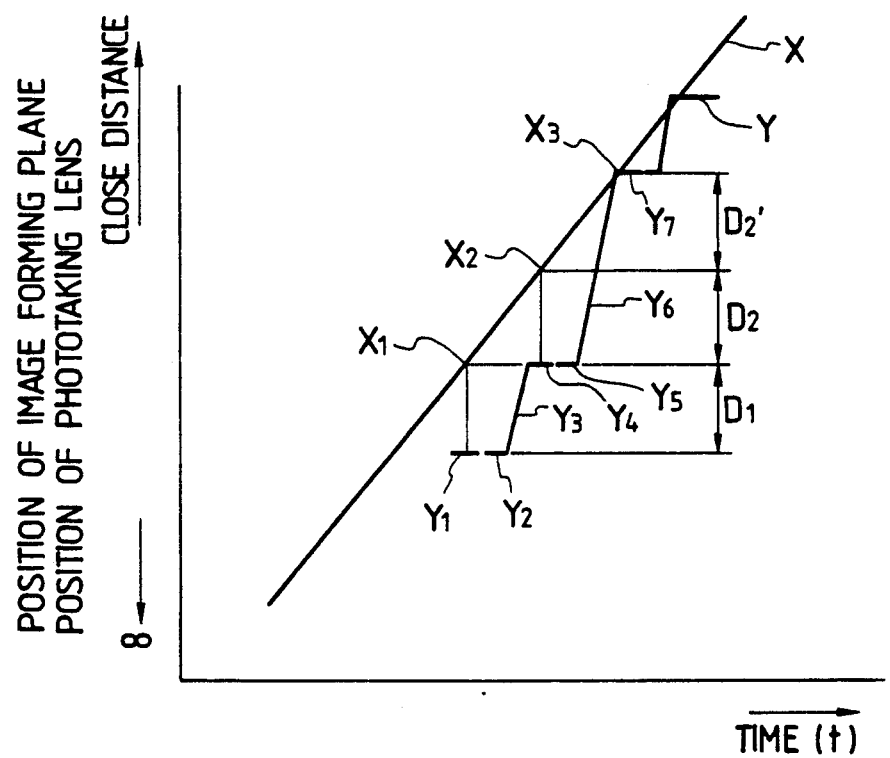
FIG. 10 is a view showing the relationships between an object image forming plane position and a camera lens position.

The photometering unit 30 performs photometering with a phototaking image plane divided into six areas P1 to P6, as shown in FIG. 9. As shown in FIG. 3, the photometering unit 30 consists of six light-receiving elements 31a to 31f respectively corresponding to areas P1 to P6 and a photometering circuit 32 for calculating brightness B1 to B6 in each of the above areas on the basis of the values obtained by photometering each of the light-receiving elements 31a to 31f.

Also, a part of the light flux which passes through the main mirror 21 is reflected by a submirror 26 and led to a focus detecting device 40. When an object image is formed on an image sensor 42 by means of a focus detection lens group 41, an electrical signal corresponding to the light intensity distribution of this object image is generated. A defocus amount calculation unit 43 calculates a defocus amount Df corresponding to the distance between the object image plane and the film plane for the camera lens group 11 on the basis of the electrical signal. The defocus amount Df detected by the focus detecting device 40 is stored in sequence in a defocus amount memory 44.

A distance encoder 51 outputs a signal unique to the movement of the lens group 11. A distance to an object, i.e., an object distance x, is detected. The detected object distance (phototaking) x is stored in an object distance memory 52. Also provided in the camera lens body 10 is a focus distance (focal length) memory 53 where the focus distance f of the lens is stored.

Figure 1:
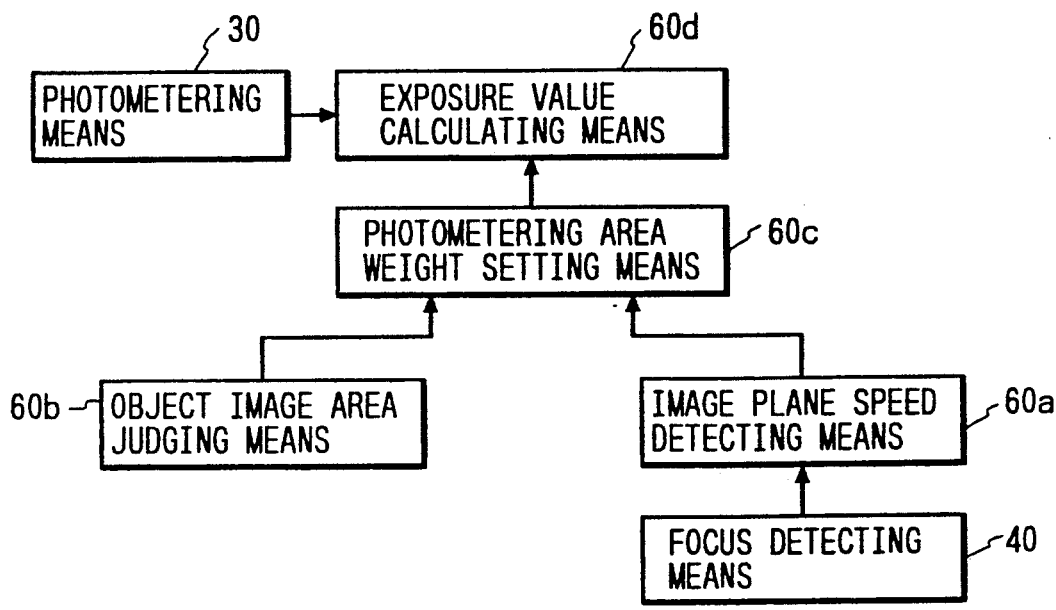
FIG. 1 is a block diagram of a first embodiment of the automatic exposure control apparatus of the invention.

A control unit 60 comprises a microcomputer constituting an image plane speed detecting means 60a, an object image area judging means 60b, a photometering area weight setting means 60c, and an exposure value calculation means 60d, all of which are shown in FIG. 1, and peripheral devices for the microcomputer. The control section 60 inputs brightness values B1 to B6, the defocus amount Df, the focal length f, and the object distance x. On the basis of these values, the control unit 60 calculates an exposure value to be used at a time of exposure by a procedure which will be described later, and drives a diaphragm 71 and a shutter 72 via an exposure control unit 70.

FIG. 4 is a flowchart showing an exposure value calculation processing sequence performed by the control unit 60. Referring to FIG. 4, the operation of the automatic exposure control apparatus will now be explained.

In step S1, the defocus amount Df is input from the memory 44; brightness values B1 to B6 are input from the photometering circuit 32; the focal length f of the lens is input from the memory 53; and the object distance x is input from the memory 52. In a subsequent step S2, a movement speed V0 of the object image plane of the lens group 11 in response to the object movement is detected on the basis of the current and past defocus amounts Df. This object image plane speed detection method is previously disclosed in Japanese Patent Laid-Open No. 63-148218, and thus no explanation thereof will be given.

In step S3, a check is made to determine whether the object is moving closer to, away from, or is stationary with respect to the camera on the basis of the object image plane movement speed V0 (i.e., movement per unit time) determined in step S2. The determination is made based on the value of V0 relative to a threshold value A. When $V0 > +A$, this indicates that the object is moving closer to the camera and the process proceeds to step S4; and when $V0 < -A$, this indicates that the object is moving away from the camera and the process proceeds to step S5. When $+A \geq V0 \geq -A$, the object is treated as stationary and the process proceeds to step S13. In the last-mentioned case, the object is treated as stationary because the size of the object image within the phototaking image plane will not differ much between a photometering time and an exposure time. To make the operation more easily understandable, an explanation concerning the same will be given below, with the assumption that the object is a person.

In step S4, a flag F1 is set in the control unit 60. In step S5, the flag F1 is reset. In step S6, a parameter (x/f) for the distance is calculated on the basis of the focal length f and the object distance x read in step S1. In a subsequent step S7, a check is made to determine whether $20 < (x/f) \leq 100$. When it is, it is assumed that the object is within the intermediate range of the camera, that is, the distance to the person is neither near nor far, and the process proceeds to step S8. When it is not, the process proceeds to step S11. In step S8, a check is made to determine whether the flag F1 has been set. When F1=1, i.e., the object is approaching the camera, and the process proceeds to step S9. When F1=0, the object is moving away from the camera, and the process proceeds to step S13.

Figure 5:
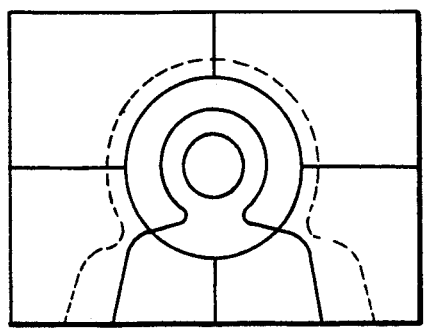
FIG. 5 is a view showing a person's image as it appears within a phototaking image plane when the person is at an intermediate distance from the camera.

When the conditions in step S8 are met, that is, when the person is at an intermediate distance and approaching the camera, the size of the person's image is approximately that indicated by a solid line shown in FIG. 5. One conventional method for calculating exposure values is multi-pattern photometering which measures brightnesses B1 to B6 of each area. However, since the person's image becomes approximately the size indicated by the dashed line in FIG. 5 at the time of exposure, a more appropriate exposure can be effected if the exposure value is determined by using spot photometering values in which the brightness B6 only of the area P6 is used. Therefore, in step S9, an exposure value is calculated on the basis of the brightness B6 of the area P6. At this time, an exposure value may be calculated by the center-weighted photometering value on the basis of the brightnesses of areas P5 and P6.

On the other hand, if the conditions in step S8 have not been met, that is, the person is at an intermediate distance and moving away from the camera, the size of the person's image at the time of exposure becomes even smaller than that indicated by the solid line in FIG. 5. Whether the exposure value for the surrounding scene is proper is more important than the setting of an exposure value for the person. Hence, in step S13, the calculation of an exposure value is performed by using multi-pattern photometering values in which brightnesses B1 to B6 of areas P1 to P6 are taken into account.

If, for example, areas P1 and P2 are very bright, it is assumed that they are illuminated by direct rays of the sun. The values of these areas P1 and P2 are ignored and a weight is given to the less bright areas P3 to P6. When the luminance of areas P5 and P6, or area P6, is lower than for the other areas, an exposure value is determined by using photometering values by the center-weight method in which brightnesses B5 and B6 of areas P5 and P6 are used, assuming that the person is positioned against the light.

Referring to FIG. 5, if the conditions described above are not met, a check is made in step S11 to determine whether $(x/f) > 100$. If it is, the object is far from the camera, that is, the distance to the person is far, as indicated by the solid line in FIG. 6. Next, a check is made to determine whether or not F1=1, that is, whether the person is approaching the camera. If he is, the process proceeds to step S9; if not, the process proceeds to step S13.

Figure 6:
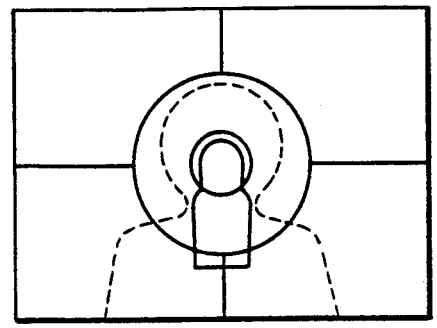
FIG. 6 is a view showing an image of a person at a far distance from the camera as appearing within a phototaking image plane.

When the person is far away and approaching the camera, the size of the person's image at the time of exposure becomes approximately that indicated by the dashed line in FIG. 6. As described above, an exposure value is determined either by spot photometering or center-weighted photometering. On the other hand, if the person is far away and is moving away from the camera, the size of the person's image at the time of exposure becomes even smaller than that indicated by the solid line in FIG. 6. The exposure value of the surrounding scene is then more important than that of the person, and, as described above, the exposure value is calculated by using the multi-pattern photometering values.

Figure 7:
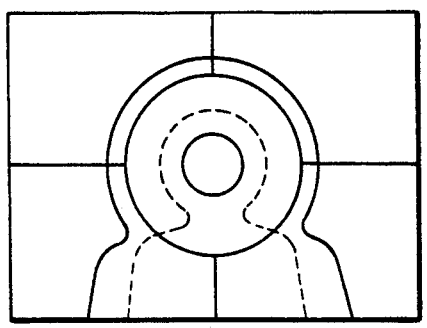
FIG. 7 is a view showing an image of a person at a near distance from the camera as appearing within a phototaking image plane.

If the conditions in both steps S7 and S11 are not met, the object is near the camera, that is, the distance to the person is near, a state indicated by a solid line in FIG. 7. When the person is approaching the camera, the size of the person's image in a phototaking image plane becomes even larger. Therefore, exposure values by spot photometering and multi-pattern photometering do not differ much. In step S13, the exposure value is determined by using multi-pattern photometering values. On the other hand, when the person is moving away from the camera, the size of his image at the time of exposure becomes approximately that indicated by the dashed line in FIG. 7. An exposure value is determined by using the multi-pattern photometering values because, as described above, the importance of the surroundings around the person's image becomes greater.

When it is determined in step S3 that the object is stationary, the process proceeds to step S13 where the exposure value is determined by using the multi-pattern photometering values, as described above.

After the exposure value is calculated in this way, a diaphragm and a shutter speed are set on the basis of the calculated exposure value in step S10. The diaphragm 71 and the shutter 72 are driven via the exposure control section 70 and a photograph is taken.

Second Embodiment

Figure 11:
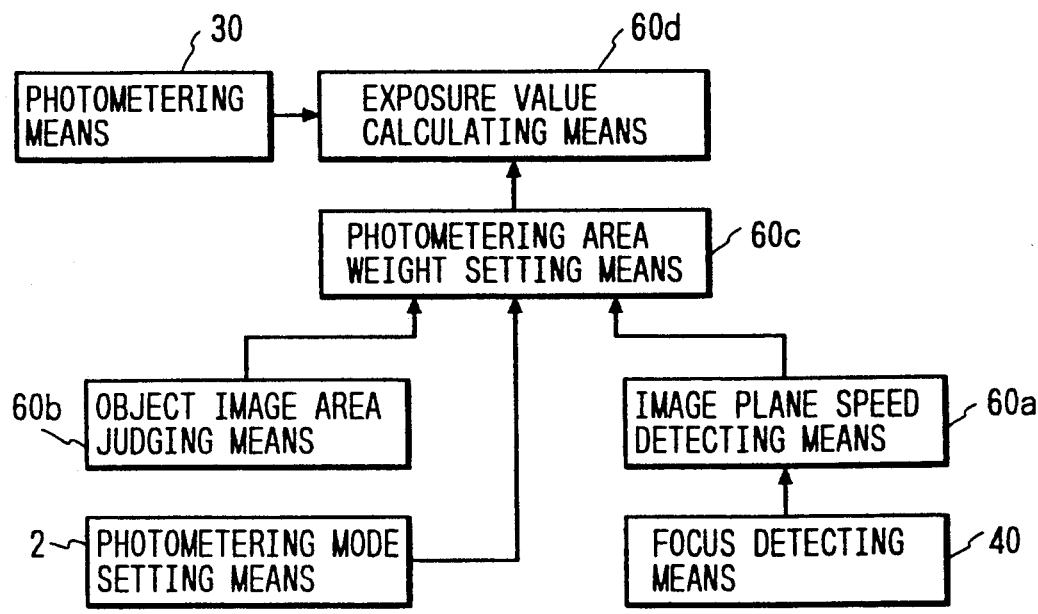
FIG. 11 is a block diagram of a second embodiment of the automatic exposure control apparatus of the invention.
Figure 12:
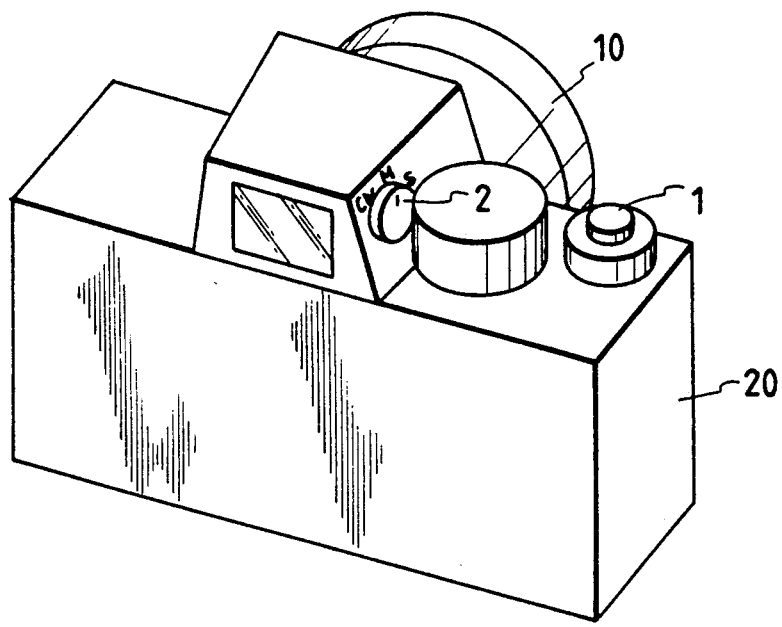
FIG. 12 is a rear perspective view of a camera equipped with the second embodiment.

FIG. 12 is a rear perspective view of a camera equipped with an automatic exposure control apparatus according to a second embodiment of the present invention shown in FIG. 11. Reference numeral 1 denotes a shutter release button; reference numeral 2 denotes a photometering mode setting dial, which is disposed on the side of the finder of camera body 20. In this second embodiment, an exposure calculation is performed according to a photometering mode, such as multi-pattern photometering, center-weighted photometering, or spot photometering, which is set by the photometering mode setting dial 2. The construction of the second embodiment is the same as that of the first embodiment with the exception of the photometering mode setting dial 2, and thus an explanation concerning the same will not be given.

Figure 13:
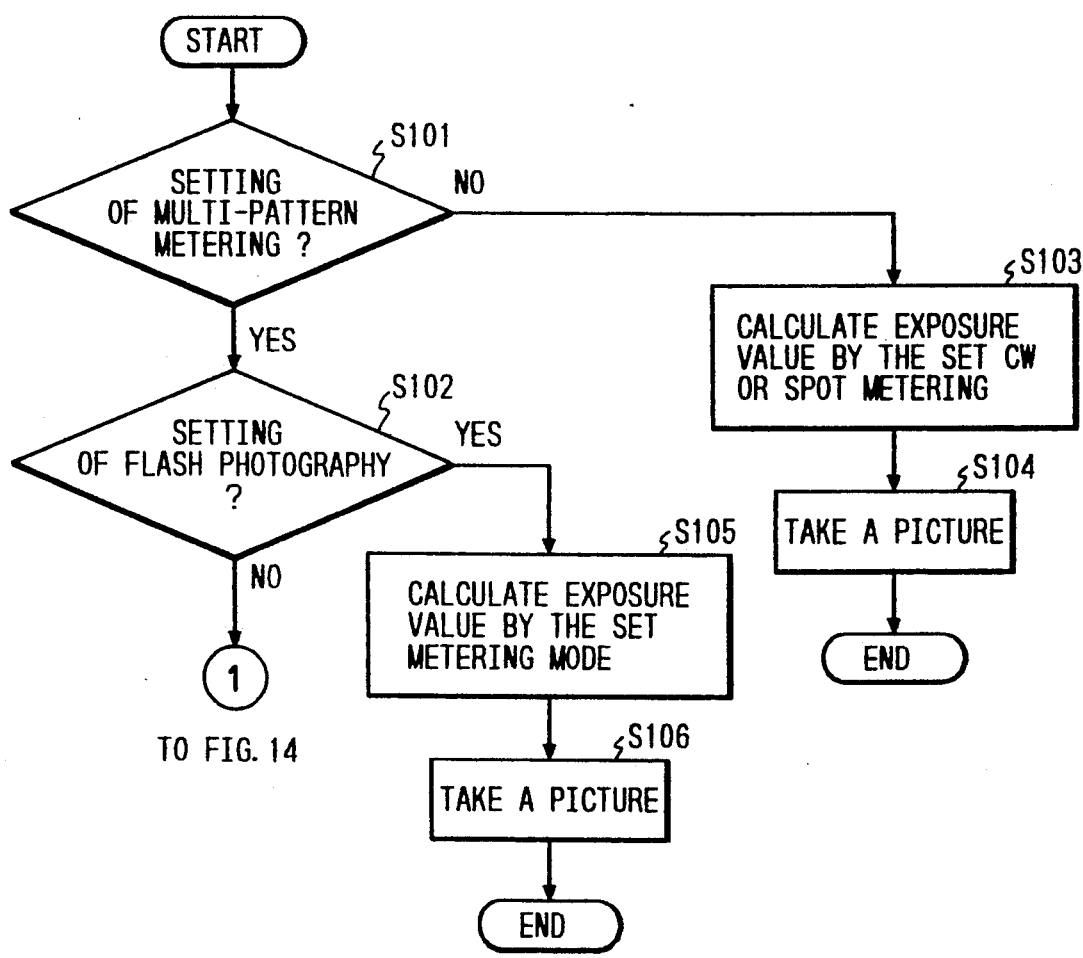
FIG. 13 is a flowchart showing an exposure value calculation processing sequence of the second embodiment.

FIG. 13 is a flowchart showing an exposure value calculation processing sequence performed by the control section 60. Referring to this flowchart, the operation of the second embodiment will be explained. The same step numbers are used for the same processes as those in the flowchart of FIG. 4, and the explanation centers on points of difference.

In step S101, a check is made to determine whether or not the mode has been set to the multi-pattern photometering mode by the photometering mode setting dial 2. When the multi-pattern photometering mode has been set, the process proceeds to step S102; if not, the process proceeds to step S103. In step S102, a check is made to determine whether or not the mode has been set to the strobe (flash) photographing mode by a photographing mode setting dial (not shown). When the mode is the strobe photographing mode, the process proceeds to step S1 (FIG. 14); if not, the process proceeds to step S105.

Figure 14:
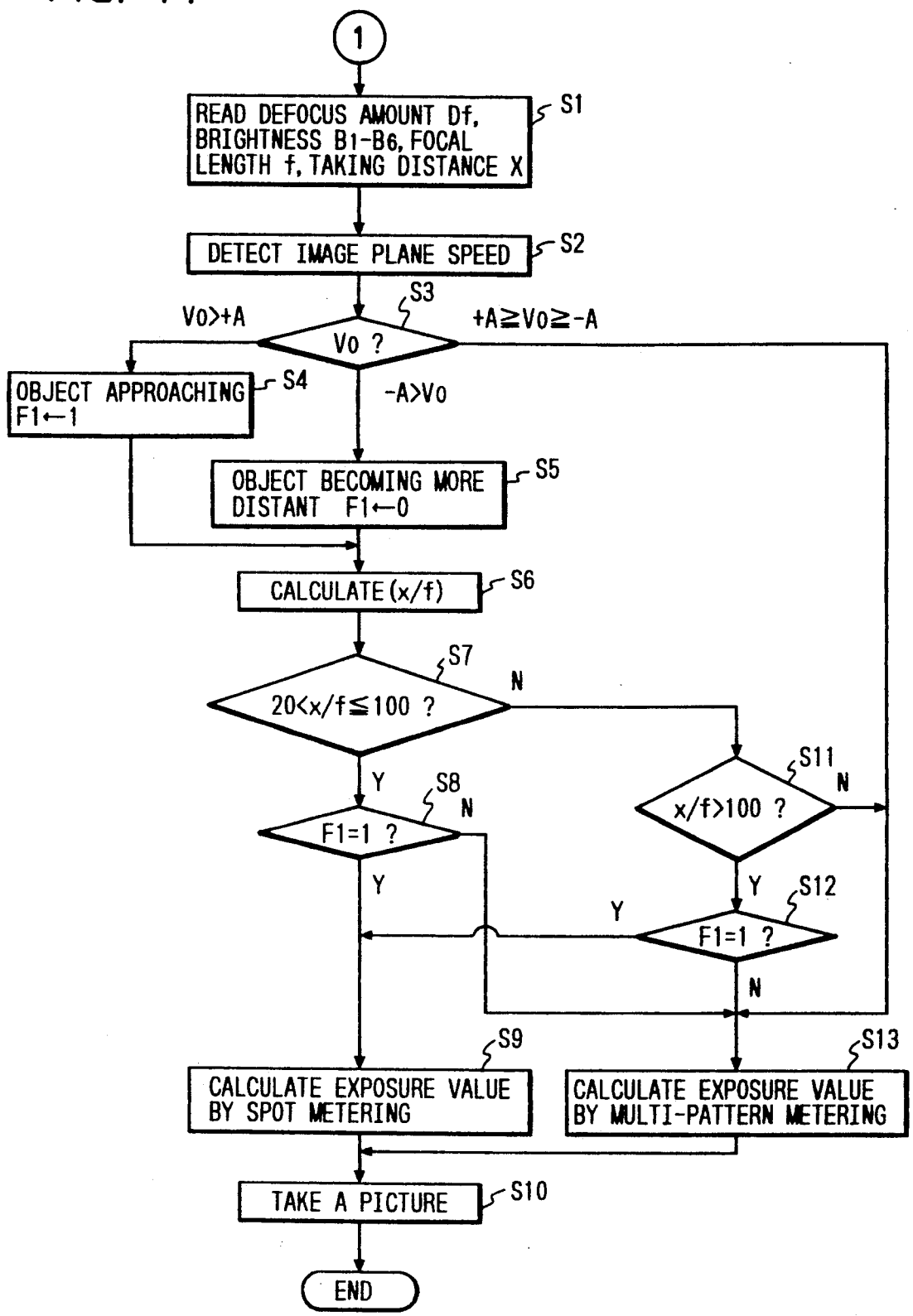
FIG. 14 is a flowchart showing an exposure value calculation processing sequence of the second embodiment.

When the multi-pattern photometering mode has been set and the photographing is not by the strobe photographing, a photograph is taken according to the process in steps S1 to S10 in FIG. 14, which steps have already been described above in connection with FIG. 4.

When the multi-pattern photometering mode has not been set, an exposure calculation is performed in step S103 according to the photometering mode set with the photometering mode setting dial 2, i.e., the center-weighted photometering CW or spot photometering SP. In a subsequent step S104, a diaphragm and a shutter speed are set on the basis of the calculated exposure value. A photograph is taken by driving the diaphragm 71 and the shutter 72 via the exposure control section 70.

When the multi-pattern photometering has been set and the strobe photographing mode has been set, an exposure value is calculated in step S105 according to the photometering mode set with the photometering mode setting dial 2. In a subsequent step S106, a photograph is taken.

Third Embodiment

Figure 15:
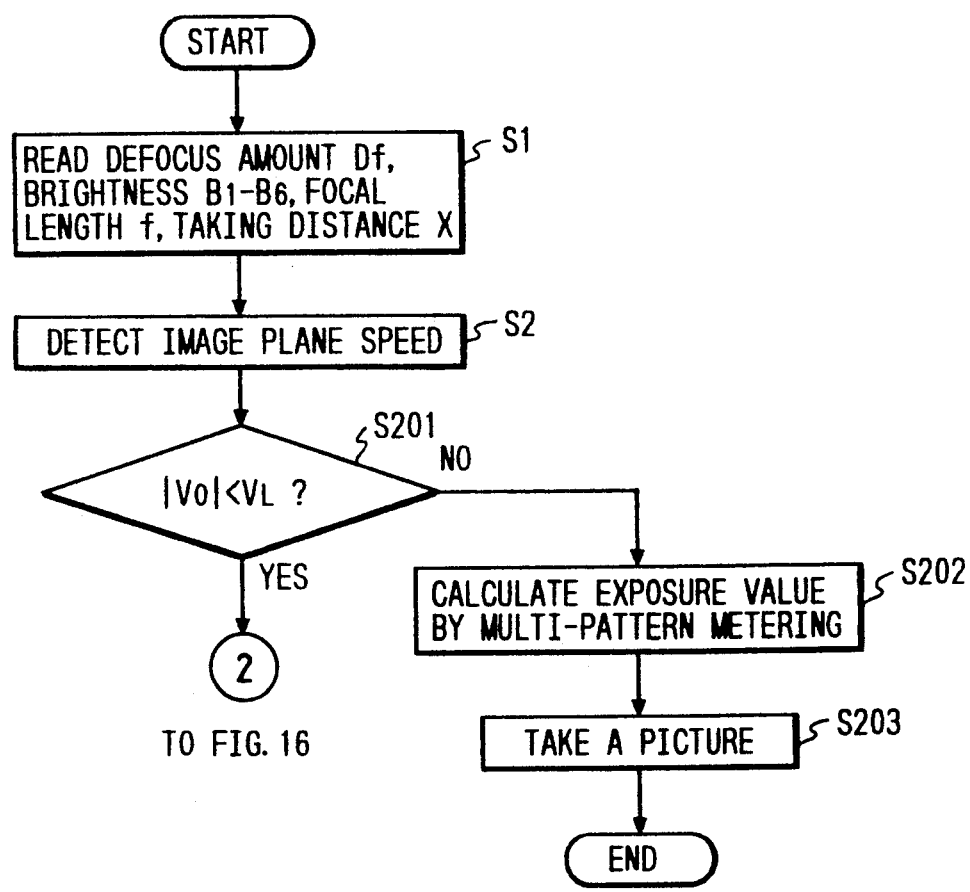
FIG. 15 is a flowchart showing an exposure value calculation processing sequence of a third embodiment.
Figure 16:
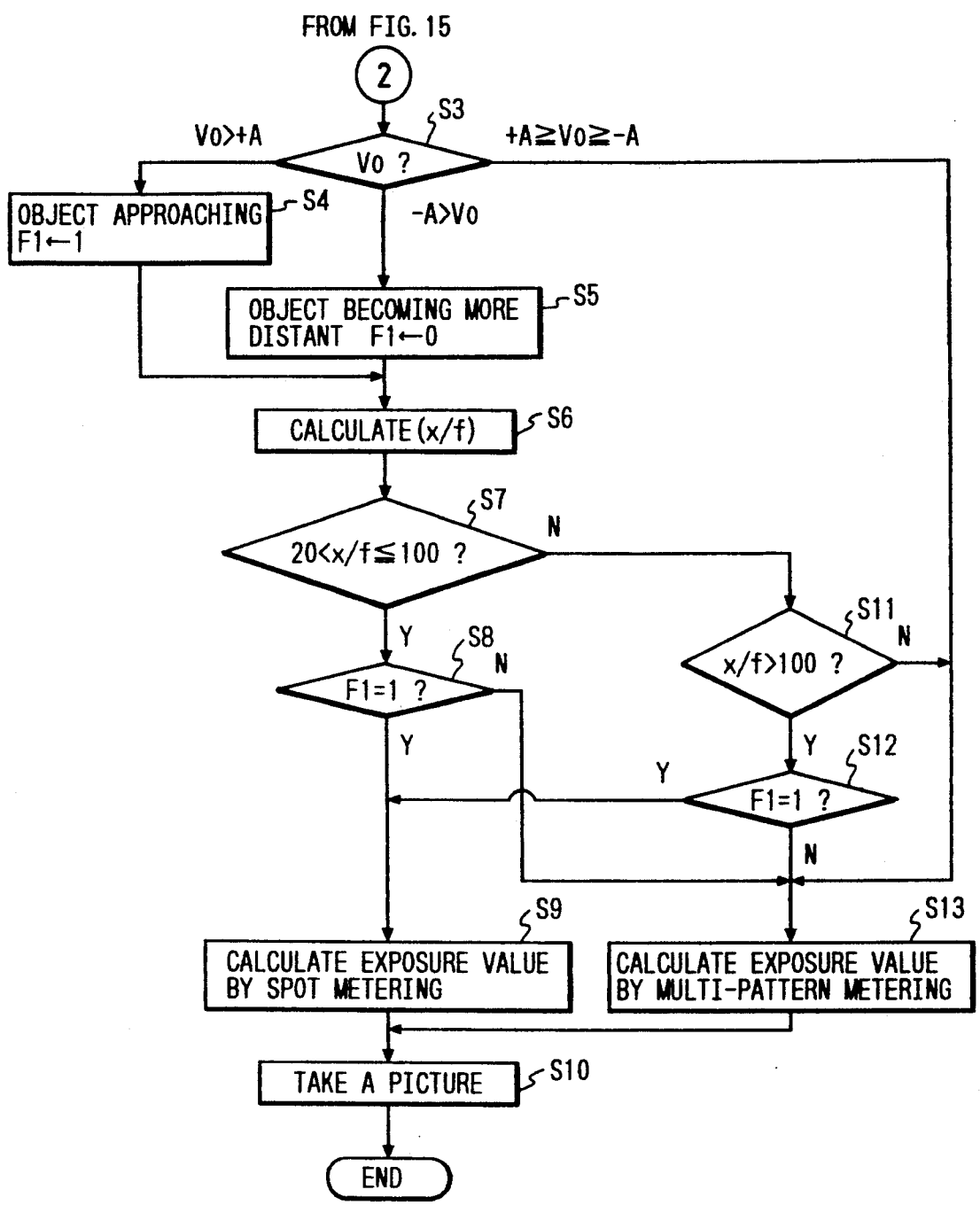
FIG. 16 is a flowchart showing an exposure value calculation processing sequence of the third embodiment.

Next, a third embodiment will be explained with reference to flowcharts shown in FIGS. 15 and 16. The basic arrangement of a camera including the apparatus of the third embodiment is the same as that shown in FIG. 2, and thus an explanation thereof is omitted. Steps corresponding to those in the flowcharts of FIGS. 4, 13, and 14 are designated by the same step numbers as previously used, and the explanation centers on points of difference.

In steps S1 and S2, as described above, a defocus amount Df, brightnesses B1 to B6, a focal length f, and an object distance x are read. The movement speed V0 of the object image plane of the lens group 11 in response to the object movement is detected on the basis of the current and past defocus amounts Df. In a subsequent step S201, a check is made to determine whether or not the absolute value of the detected movement speed V0 of the object image plane is smaller than a limit velocity VL. When the absolute value of the detected movement speed V0 of the object image plane is smaller than the limit velocity VL, a photometering area is set on the basis of the object image plane movement velocity V0 and the object image area, and a photograph is taken according to the process in steps S3 to S10, already described. When the absolute value of the detected movement speed V0 of the object image plane is greater than the limit velocity VL, a photometering area is set in step S202 by a conventional multi-pattern photometering, in which an object image plane movement speed is not taken into account, and an exposure value is calculated. In a subsequent step S203, a photograph is taken.

The conventional photometering method, in which an object image plane movement speed is not taken into account, is used for the following reasons when the absolute value of the detected movement speed V0 of the object image plane is greater than the limit velocity VL:

(1) The object for which range finding has been performed move out of the range finding frame, and the range finding of another object is being performed; and (2) The object is actually moving at a considerably high speed. The likelihood of case (1) is generally high. In the case (1), the object for range finding has changed, so that there is no point in setting a photometering area by taking the object image plane movement speed V0 into account. Therefore, an exposure value is calculated by the conventional photometering method.

In the foregoing, the object image plane movement speed V0 is compared with the limit velocity VL and a judgment is made as to whether a photometering area should be set by taking the object image plane movement speed V0 into account or by the conventional photometering method. The following are examples of additional techniques which may be used: (a) The measurement of the image plane movement speed of an object is performed at least twice before a photograph is taken, and the judgment is made on the basis of the difference between the two measured values according to the relationship.

$$|V0n - V0n-1| < L \qquad (1)$$

where V0n is a current object image plane movement speed, V0n−1 is an object image plane movement speed at a previous time, and L is a threshold value.

When the difference between the two measured values is smaller than the threshold value L, a photometering area is set by taking the object image plane movement speed V0 into account. When it is not, the photometering area is set by the conventional photometering method. (b) The judgement is made based on the relationship $$|dV0/dt| < \alpha \qquad (2)$$

where $\alpha$ is a limit image plane movement acceleration.

When the image plane acceleration is smaller than the limit image plane movement acceleration, the photometering area is set by taking the object image plane movement speed V0 into account. When it is not, the photometering area is set by the conventional photometering method.

When the difference between the two object image plane movement speeds is greater than the threshold value L, or when the object image plane acceleration is greater than the limit image plane movement acceleration a, the object is moving with a substantial degree of non-uniformity with respect to the optical axis of the camera, or the object is out of the range finding frame. In the former case, it cannot be predicted what size the object will become within the phototaking image plane at the time of exposure. In the latter case, there is no point in setting the photometering area by taking the object image plane movement speed into account.

Fourth Embodiment

Figure 17:
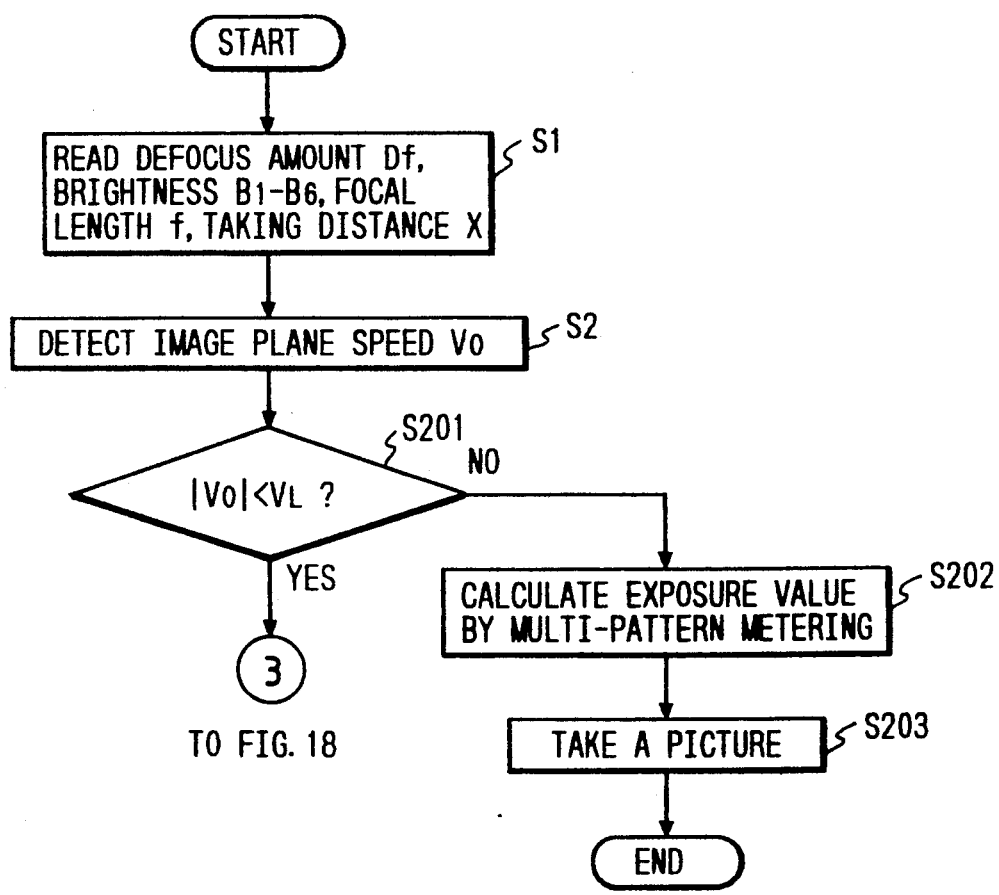
FIG. 17 is a flowchart showing an exposure value calculation processing sequence of a fourth embodiment.

Next, a fourth embodiment will be explained with reference to flowcharts shown in FIGS. 17 and 18. The basic arrangement of a camera including the apparatus of the fourth embodiment is the same as that shown in FIG. 2, and thus an explanation thereof is omitted. Steps corresponding to those in the flowcharts of FIGS. 4, 13, 14, 15 and 16 are designated by the same step numbers as previously used, and the explanation centers on points of difference.

In steps S1 and S2, as described above, a defocus amount Df, brightnesses B1 to B6, a focal length f, and an object distance x are read. The movement speed V0 of the object image plane of the lens group 11 in response to the object movement is detected on the basis of the current and past defocus amounts Df. In a subsequent step S201, a check is made to determine whether or not the absolute value of the detected movement speed V0 of the object image plane is smaller than a limit velocity VL. When the absolute value of the detected movement speed V0 of the object image plane is smaller than the limit velocity VL, the process proceeds to step S301 in FIG. 18. When it is not, the process proceeds to step S202 where a photometering area is set by a conventional multi-pattern photometering in which an object image plane movement speed is not taken into account, and an exposure value is calculated. In a subsequent step S203, a photograph is taken.

Figure 18:
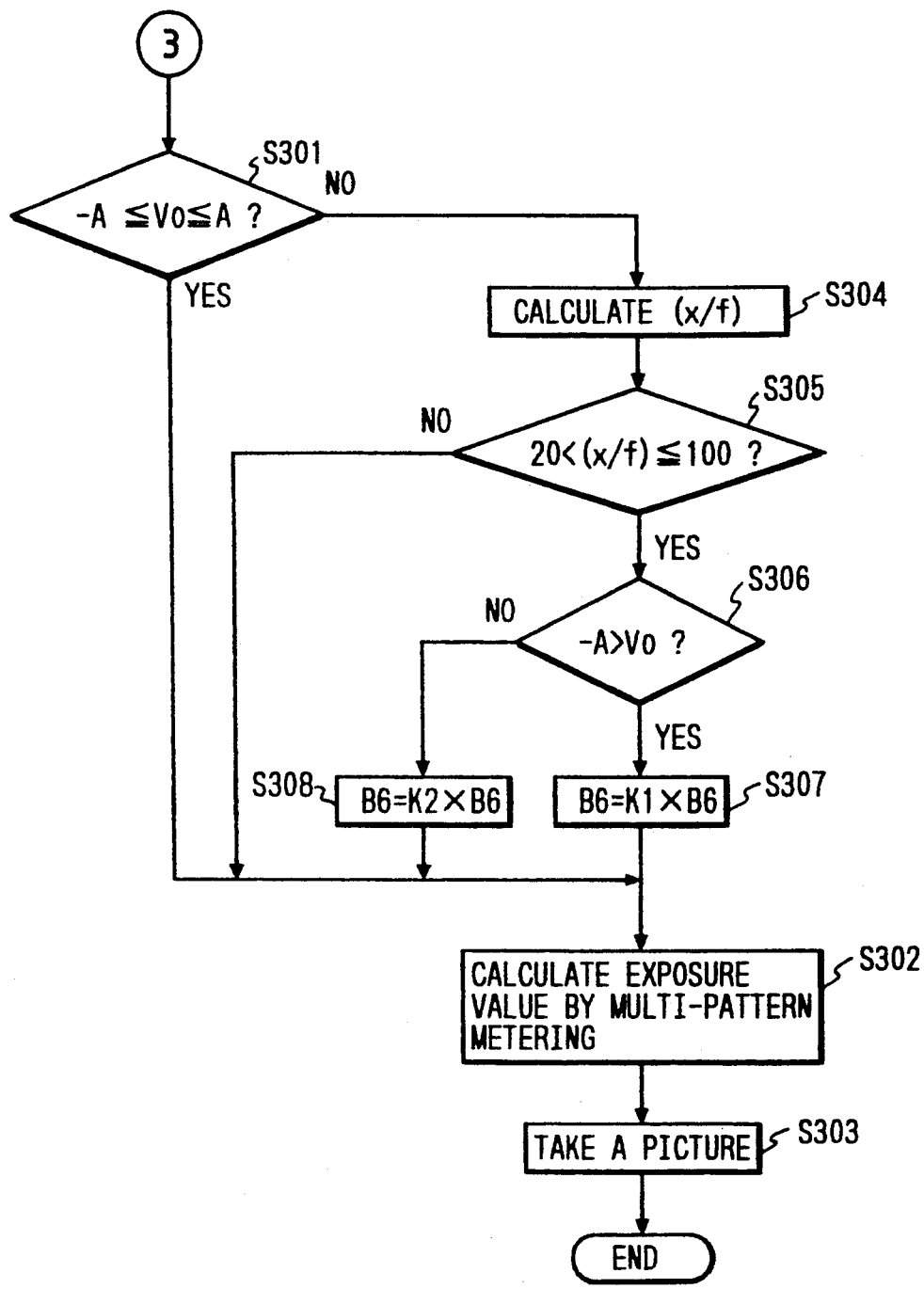
FIG. 18 is a flowchart showing an exposure value calculation processing sequence of the fourth embodiment.

When the absolute value of the object image plane movement speed V0 is smaller than the limit velocity VL, a check is made to determine whether or not the object is moving or is stationary relative to the camera in step S301 in FIG. 18. More particularly, when $-A \leq V0 \leq A$, the object is judged to be stationary and the process proceeds to step S302. When it is not, the object is judged to be moving relative to the camera and the process proceeds to step S304. For a stationary object, an exposure value is determined by the above-mentioned multi-pattern photometering in step S302. In step S303, a photograph is taken.

When the object is moving, on the other hand, a parameter (x/f) for the distance is calculated in step S304 on the basis of the focal length f and the object distance x. In step S305, a check is made to determine whether $20 < (x/f) \leq 100$. When it is, it is assumed that the object is within the intermediate range of the camera, i.e., the distance is neither near nor far, and the process proceeds to step S306. When it is not, the process proceeds to step S302. In step S306, a check is made to determine whether $-A > V0$, i.e., whether the object is moving away from or approaching the camera. When it is moving away from the camera, the process proceeds to step S307. When it is approaching the camera, the process proceeds to step S308. In step S307, a photometering value B6 for the central section of the screen is multiplied by a coefficient K1. In step S308, the photometering value B6 for the central section of the image plane is multiplied by a coefficient K2. The coefficient K1 is a value smaller than 1, or example, 0.8 or 0.7. The coefficient K2 is a value greater than 1, for example, 1.2 or 1.3. Thereafter, an exposure value is calculated by multi-pattern photometering in step S302 on the basis of these photometering values. That is, when the object is moving away from the camera, since the area of the object positioned in the center becomes smaller at the time of exposure than at the time of photometering, the photometering value B6 in the central section is multiplied by the coefficient K1 which is smaller than 1 so that the degree of influence is made smaller. When the object is approaching the camera, on the other hand, since the area of the object becomes larger at the time of exposure than at the time of photometering, the photometering value B6 in the central section is multiplied by the coefficient K2 which is larger than 1 so that the degree of influence is made larger.

The above-mentioned coefficients K1 and K2 may be a variable. For example, a variable based on a parameter (x/f) for the distance which is changed during the time period from the time of photometering to the time of exposure may be used, or a variable based on the object image plane movement speed V0 may be used.

As described above, a distance to the object is determined by a parameter (x/f) for the distance. The size of the object at the time of exposure is predicted by judging whether the object is approaching or moving away from the camera based on an object image plane movement speed. On the basis of this prediction, an exposure value is calculated by taking the weight of each photometering area into account. Therefore, an exposure more appropriate than in the prior art can be performed.

In the second embodiment, a photometering area is set by taking the object image plane movement speed V0 into account, and the above-described exposure calculation is performed only when the multi-pattern photometering has been set. Therefore, a photograph can be taken in the photometering mode desired by a photographer when the photographer has set the center-weighted photometering or spot photometering.

In the third embodiment, when the object image plane movement speed V0 is greater than the limit velocity VL, an exposure calculation is performed by a conventional multi-pattern photometering. This avoids pointless setting of a photometering area in which the object image plane movement speed is taken into account in a case when the object is out of the range finding frame.

In the fourth embodiment, when a photometering calculation for a moving object is performed, a distance to the object is determined by a parameter (x/f) for the distance. Further, the size of the object at the time of exposure is predicted by judging whether the object is approaching or moving away from the camera on the basis of the object image plane movement speed. On the basis of this prediction, a weight is given to a photometering value for the central section, and an exposure value is calculated by multi-pattern photometering. Therefore, a proper exposure value can be obtained.

Figure 8:
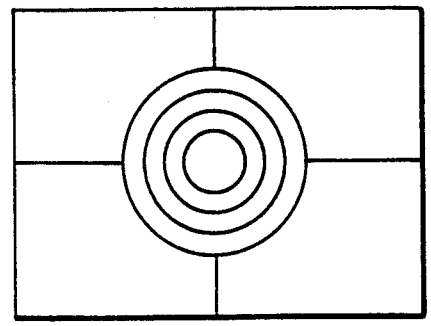
FIG. 8 is a view showing a photometering element in which the central pattern is divided into small parts.

If photometering elements in which the central pattern is divided into small parts as shown in FIG. 8 are used, and if the size of the object is identified on the basis of photometering outputs of such elements at the time of photometering, a more accurate exposure value can be determined. Also, an AF image sensor having a large width may be used, and the size of the object can be identified on the basis of its output.

In the embodiments described above, the distance to the object is detected by the distance encoder 51 which outputs a unique signal corresponding to the movement of the lens group 11. The distance to the object may also be detected by counting a number of pulses which are generated when the camera lens is driven. In this case, an encoder may be arranged with the lens group 11 so as to output pulses corresponding to the movement of the range ring, and the camera lens may be reset to the position of ∞ or a close distance.

Although an explanation was made with a TTL focal point adjusting apparatus taken as an example in the above-described embodiments, a point eye type triangulation method may be employed.

Also, the exposure information calculation algorithm and the method of dividing a photometering area are not limited to those of the above-described embodiments. For example, a case has been described in which object distance is divided into three ranges: far, intermediate, and near. However, it may be divided into two ranges of far and near, or into four or more ranges.

As will be apparent to those skilled in the art, numerous other changes and modifications may be made in keeping with the principles and spirit of the present invention, the scope of which is defined in the appended claims.

In the description above, the photometering mode setting dial 2 constitutes a photometering mode setting means; the photometering unit 30 constitutes a photometering means; the focus detecting device 40 constitutes a focus detecting means; and the control unit 60 constitutes an image plane movement detection means, an object image area judging means, a photometering area weight setting means, and an exposure value calculation means.

What is claimed is:

1. An automatic exposure control apparatus comprising:

photometering means for photometering a plurality of areas within a phototaking image plane and outputting a plurality of photometering values each corresponding to a respective one of the areas;

focus detecting means for calculating a defocus amount corresponding to a distance between an object image plane and a film plane of a phototaking optical system;

image plane speed detection means for detecting, on the basis of current and past defocus amounts calculated by said focus detecting means, movement speed of the object image plane of the phototaking optical system in response to movement of the object along an optical axis of the phototaking optical system;

exposure value calculation means for calculating an exposure value on the basis of photometering values output from said photometering means; and photometering area weight setting means for setting a weight of one or more of the photometering values, based on a detection result of the image plane speed detection means, to cause said exposure value calculation means to calculate a predicted exposure value which is to be used at a time of exposure and which is different from an exposure value that would be calculated for the object as positioned at the time of photometering, so as to account for predicted movement of the object between the time of photometering and the time of exposure.

2. The automatic exposure control apparatus according to claim 1, further comprising judging means for judging whether an absolute value of the movement speed of the object image plane detected by said image plane speed detection means is smaller than a predetermined value, and wherein said photometering area weight setting means effects weight setting as aforesaid when said judging means judges that said absolute value is smaller than said predetermined value.

3. The automatic exposure control apparatus according to claim 1, further comprising object image area judging means for judging an area occupied by the object image within the phototaking image plane substantially at the time of photometering, and wherein said photometering area weight setting means effects weight setting as aforesaid based additionally on the judgement result of said object image area judging means.

4. An automatic exposure control apparatus, comprising:

photometering means for photometering a plurality of areas within a phototaking image plane and outputting a plurality of photometering values each corresponding to a respective one of the areas;

photometering mode setting means for preliminarily setting a photometering mode for purposes of an exposure value calculation;

focus detecting means for calculating a defocus amount corresponding to a distance between an object image plane and a film plane of a phototaking optical system;

image plane speed detection means for detecting, on the basis of current and past defocus amounts calculated by said focus detecting means, movement speed of the object image plane of the phototaking optical system in response to movement of the object along an optical axis of the phototaking optical system;

exposure value calculating means for calculating an exposure value on the basis of photometering values output from said photometering means; and photometering area weight setting means for setting a weight of one or more of the photometering values based on a detection result of said image plane speed detection means, regardless of the preliminarily set photometering mode, to cause said exposure value calculation means to calculate a predicted exposure value which is to be used at a time of exposure and which is different from an exposure value that would be calculated under the preliminarily set photometering mode for the object as positioned at the time of photometering, so as to account for predicted movement of the object between the time of photometering and the time of exposure.

5. The automatic exposure control apparatus according to claim 4, further comprising judging means for judging whether an absolute value of the movement speed of the object image plane detected by said image plane speed detection means is smaller than a predetermined value, and wherein said photometering area weight setting means effects weight setting as aforesaid when said judging means judges that said absolute value is smaller than said predetermined value.

6. The automatic exposure control apparatus according to claim 4, further comprising object image area judging means for judging an area occupied by the object image within the phototaking image plane substantially at the time of photometering, and wherein said photometering area weight setting means effects weight setting as aforesaid based additionally on the judgment result of said object image area judging means.

7. An automatic exposure control apparatus, comprising:

photometering means for photometering a plurality of areas within a phototaking image plane and outputting a plurality of photometering values each corresponding to a respective one of the areas;

photometering mode setting means for preliminarily setting a selectable one of a flash photometering mode and a non-flash photometering mode for purposes of an exposure value calculation for flash photography and non-flash photography, respectively;

focus detecting means for calculating a defocus amount corresponding to a distance between an object image plane and a film plane of a phototaking optical system;

image plane speed detection means for detecting, on the basis of current and past defocus amounts calculated by said focus detecting means, movement speed of the object image plane of the phototaking optical system in response to movement of the object along an optical axis of the phototaking optical system;

exposure value calculation means for calculating an exposure value on the basis of photometering values output from said photometering means; and photometering area weight setting means for setting a weight of one or more of the photometering values based on a detection result of said image plane speed detection means, regardless of the preliminary setting of said non-flash photometering mode, to cause said exposure value calculation means to calculate a predicted exposure value which is to be used at a time of exposure for non-flash photography and which is different from an exposure value that would be calculated for the object as positioned at the time of photometering, so as to account for predicted movement of the object between the time of photometering and the time of exposure;

said photometering area weight setting means being disabled from effecting weight setting as aforesaid when said flash photometering mode is preliminarily set.

8. An automatic exposure control apparatus comprising:

photometering means for photometering a plurality of areas within a phototaking image plane and outputting a plurality of photometering values each corresponding to a respective one of the areas;

focus detecting means for calculating a defocus amount corresponding to a distance between an object image plane and a film plane of a phototaking optical system;

image plane speed detecting means for detecting, on the basis of defocus amounts calculated at different times by said focus detecting means, movement speed of the object image plane of the phototaking optical system in response to movement of the object along an optical axis of the phototaking optical system;

exposure value calculation means for calculating an exposure value on the basis of photometering values output from said photometering means; and means for selecting one of a plurality of exposure value calculation photometering modes, based on a detection result of said image plane speed detecting means, to cause said exposure value calculation means to calculate a predicted exposure value which is to be used at a time of exposure and which is different from an exposure value that would be calculated for the object as positioned at the time of photometering, so as to account for predicted movement of the object between the time of photometering and the time of exposure.

9. The automatic exposure control apparatus according to claim 8, wherein said selecting means effects said selecting based also on a distance to the object substantially at the time of photometering.

10. The automatic exposure control apparatus according to claim 8, further comprising photometering mode setting means operable by a photographer for preliminary setting of said photometering modes, selectively, and wherein said selecting means may select one of said photometering modes other than that preliminarily set by the photographer, depending upon the detection result of the image plane speed detection means.

* * * * *